United States Patent
Edmunds et al.

(10) Patent No.: US 6,665,085 B1
(45) Date of Patent: Dec. 16, 2003

(54) SIMULTANEOUS VOICE AND DATA COMMUNICATION FOR DIAGNOSTIC PROCEDURES IN A PRINTING OR COPYING MACHINE

(75) Inventors: Carl W. Edmunds, Fairport, NY (US); Daniel Auman, Rochester, NY (US); Kevin R. Mathers, Churchville, NY (US); Craig S. Lippolis, Webster, NY (US); Arturo M. Lorenzo, Fairport, NY (US); Carol-Lynn Goldstein, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/320,364

(22) Filed: May 25, 1999

(51) Int. Cl.⁷ .......................... G06F 15/00; G06F 11/00; H04M 1/24
(52) U.S. Cl. .......................... 358/1.15; 714/46; 379/9.06
(58) Field of Search .............................. 358/1.15, 1.14; 709/108; 379/9.06; 714/46

(56) References Cited

U.S. PATENT DOCUMENTS

| | | | |
|---|---|---|---|
| 4,823,343 A | * 4/1989 | Takahashi | 371/16 |
| 5,038,319 A | 8/1991 | Carter et al. | 364/900 |
| 5,057,866 A | 10/1991 | Hill, Jr. et al. | 355/200 |
| 5,325,156 A | 6/1994 | Ulinski | 355/209 |
| 5,369,469 A | 11/1994 | Leo et al. | 355/202 |
| 5,394,458 A | * 2/1995 | Allen et al. | 379/1 |
| 5,512,979 A | * 4/1996 | Ogura | 355/204 |
| 5,678,002 A | 10/1997 | Fawcett et al. | 395/183.01 |
| 5,694,528 A | 12/1997 | Hube | 395/113 |
| 5,787,149 A | 7/1998 | Yousefi et al. | 379/59 |
| 6,084,911 A | * 7/2000 | Ishikawa | 375/240 |
| 6,108,492 A | * 8/2000 | Miyachi | 395/114 |
| 6,282,383 B1 | * 8/2001 | Weinberger | 399/8 |

* cited by examiner

Primary Examiner—Kimberly A. Williams
Assistant Examiner—Saeid Ebrahimi
(74) Attorney, Agent, or Firm—R. Hutter

(57) ABSTRACT

A system for conveying diagnostic data from a machine, such as a digital copier or printer, to a remote specialist allows simultaneous transfer of diagnostic data and live voice data through the same communication channel. A distinct sequence of steps between the computer in the machine and the specialist's computer minimizes the chance of time-wasting errors in establishing communication.

14 Claims, 2 Drawing Sheets

SIMULTANEOUS VOICE AND DATA COMMUNICATION FOR DIAGNOSTIC PROCEDURES IN A PRINTING OR COPYING MACHINE

INCORPORATION BY REFERENCE

The following patents, assigned to the assignee hereof, are incorporated by reference: U.S. Pat. Nos. 5,038,319; 5,057,866; 5,325,156; and 5,369,469.

FIELD OF THE INVENTION

The present invention relates to diagnostic and customer-service systems for users of office equipment, such as copiers, printers, facsimile, or multifunction machines.

BACKGROUND OF THE INVENTION

Office equipment, such as printers or copiers, typically use a software-based operating system to perform essential machine functions and implement the various jobs of which the machine is capable. However, software, particularly that used in high-speed multi-function machines, is subject to various problems and faults. Additional problems also arise with the machine hardware which, in machines of this type, is extremely complex and sophisticated. Hardware and software problems that occur typically happen at a low, non-periodic rate and thus are very difficult to replicate when servicing the machine and therefore difficult to resolve. Further, many of these problems are identified by the customer, who is typically not technically trained to diagnose and service machines of this type. For this reason, it is important for a servicing organization to be able to access key machine operating information, and particularly information reflecting on the performance of the machine control system. It is further advantageous if information reflecting on the performance machine can be readily gathered and exported electronically, either through a computer network, over telephone lines, or other communication media capabilities, to a specialist who can interpret the diagnostic data and advise the customer what to do about a problem.

In the current market environment, particularly in regard to office equipment such as printers, copiers, and computers, an economic premium is placed on the ability for remote service personnel to interact with a customer as soon as the customer needs help. It is common in various industries to provide 24-hour service lines so that a user of a machine will be able to conveniently contact trained help personnel, who will aid the user in using the machine. In situations where the machine is functioning abnormally, the help personnel (hereinafter referred to as a "specialist") is typically contacted over the telephone to advise the customer (hereinafter referred to as the "user") to perform minor corrections or repairs to the machine, such as removing jammed paper, etc., in the case of a printer or copier. Ideally, the user should be able to speak directly to the specialist who can advise the user what should be done while the specialist has access to real-time diagnostic data relating to the performance of the machine. With both voice communication to the user and the collection of electronic data, the specialist-based service system can provide maximum customer satisfaction.

DESCRIPTION OF THE PRIOR ART

In the prior art, U.S. Pat. No. 5,038,319 discloses a system for remotely accessing certain operating data in an electrostatographic reproduction machine, for use in analyzing machine faults and software crashes, with transfer of the data to a remote service site by telecommunications line.

U.S. Pat. No. 5,057,866 discloses a technique for monitoring machine status conditions and initiating communication with a remote computer relative to the status conditions of the machine.

U.S. Pat. No. 5,369,469 discloses a method of receiving and processing verbal input from a user of a printing machine. In this patent, the printing machine itself includes a voice-input activator, a voice receiver, and an output signal connected to a communications medium. A user can thus provide verbal input directly into the printing machine itself, and this information is transferred to a remote specialist.

U.S. Pat. No. 5,325,156 discloses a service call system for reprographic machines. An operator-initiated calling routine automatically communicates the machine with a remote diagnostic or service facility. Predetermined data relating to the identity of the machine and the nature of the fault are communicated at the time of initial call. The system provides for interactive communication to obtain additional information or display status messages at the reprographic machine. In this disclosure, a reprographic machine having a digital display is capable of displaying a one-button "call for service" utility. However, this reference holds as an ideal a system in which the specialist can service the machine invisibly to the user, without oral communication between the user and specialist (col. 6, lines 25–27).

U.S. Pat. No. 5,678,002 discloses an automated system for diagnosing and resolving computer-related problems from a product support center. The traditional roles of the product engineering customer are largely supplanted by execution of specialized client/server software programs on the respective computers.

U.S. Pat. No. 5,694,528 discloses a system for performing a diagnostic operation relative to a digital printing system, by reference to electronic data corresponding with one or more dialog screens stored in a memory of the printing system. A telecommunications link is formed between a facsimile transmission system of the printing system and a facsimile receiving system of the remote diagnostic facility, and the electronic data corresponding with one of the dialog screens is specified for transmission thereof across the communication link.

U.S. Pat. No. 5,787,149 discloses a method for managing remotely located document-producing machines by using cellular phone technology. An apparatus includes a central computer, a central cellular radio station, and a number of remote document-producing nodes. The central computer generates a copier management command directed towards a selected one of the remote document-producing nodes, and supplies this command to the central cellular radio station. This radio station then uses a central cellular radio to relay the copier management command to the selected remote copier node.

SUMMARY OF THE INVENTION

According to the present invention, there is provided a method and apparatus for permitting a user and a specialist having a computer to perform a diagnostic procedure on a machine. Diagnostic means gather diagnostic data about a physical condition of the machine, the diagnostic means further including means for identifying the machine by a serial number. Communication means permit diagnostic data to pass between the diagnostic means and the specialist's computer, and permit voice data to pass between the user and the specialist. Means are provided for the user to initiate communication with the specialist. In response to the user initiating communication with the specialist, the serial number of the machine is sent to the specialist's computer and the specialist's computer initiates voice communication to the user.

DETAILED DESCRIPTION OF THE INVENTION

Figure 1:
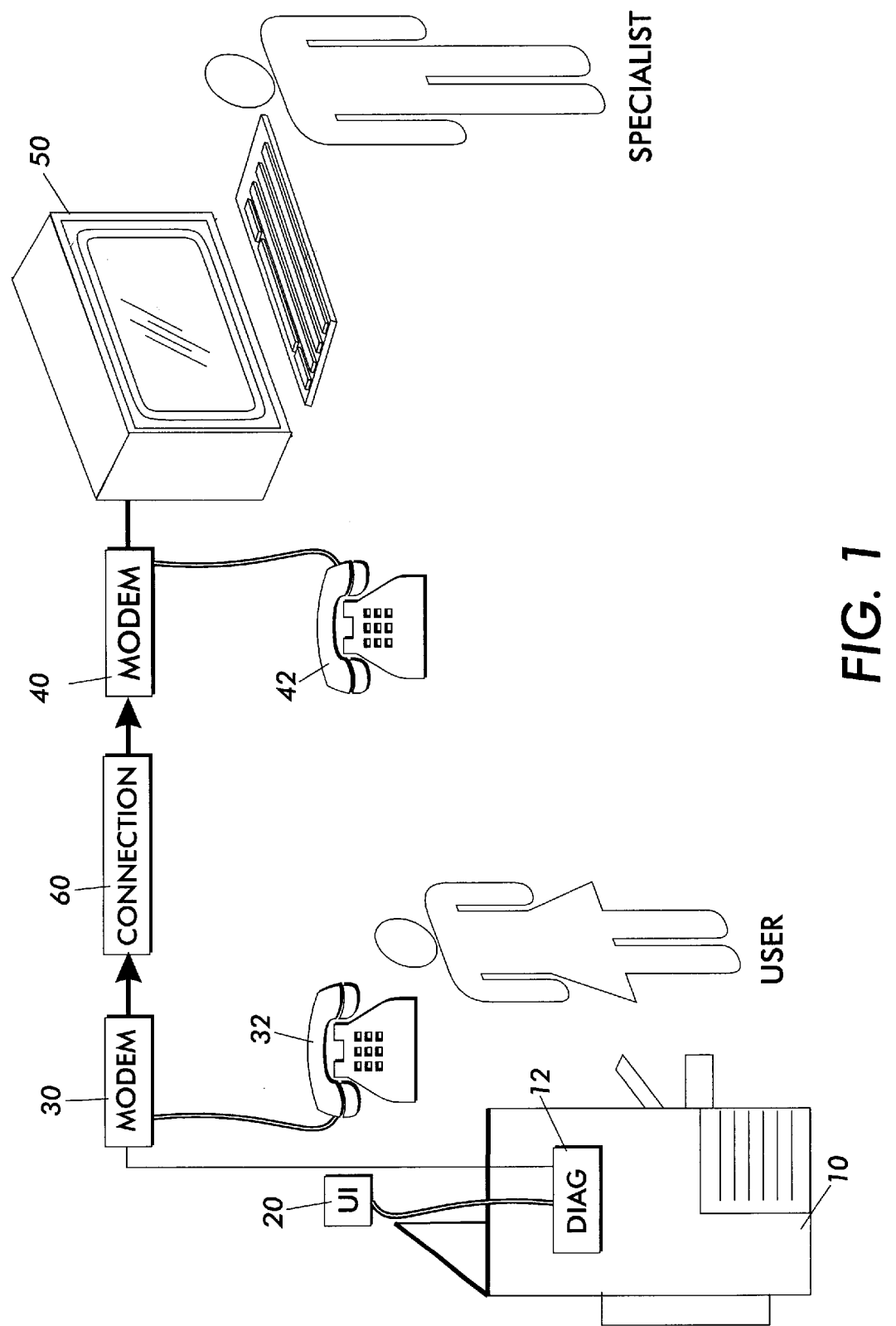
FIG. 1 is a diagram showing the essential elements enabling the system of the present invention.

FIG. 1 is a simple diagram showing the essential elements for enabling the invention in the context of office equipment such as a digital printer or copier, which is indicated as 10. As is well known in the art, and particularly as is demonstrated in the patents incorporated by reference above, it is typical for sophisticated office equipment, such as 10, to include a user interface 20, which can be a CRT or a touch screen, as well as a modem 30, through which software within the machine 10 can interface with a remote computer via a telephone connection. Also as is well known in the art, and as demonstrated in the patents incorporated by reference above, the machine 10 can include diagnostic means, such as indicated as 12, incorporating software in combination with any number of electromechanical sensors (not shown), for gathering data about the physical condition of the machine 10 at any given time. In the context of office equipment, such sensors can report on the position of paper sheets within the machine, the temperature of various members within the machine, the presence of electric charges at certain places within the machine, etc. These measurable physical conditions detected by the various sensors can be assembled as "diagnostic data" in the software of the diagnostic means 12, and the data for a particular machine 10 can be sent as needed through modem 30 to a particular destination.

According to the present invention, the machine 10 includes means for retaining a serial number unique to that particular machine 10, and can transmit this serial number through modem 30 to a remote computer through telecommunication media. In this particular embodiment, such serial number data could be included, for example, in the diagnostic means 12.

For a user located near a particular machine 10, and also near a voice telephone 32, it would be desirable, should service or other help be required for the machine 10, to be able to contact a specialist who would be able to advise the user, for example, how to do a minor repair on the machine 10, such as remove a paper jam, or else to advise the user to have a trained service person visit the machine 10. Further shown in FIG. 1 is a human specialist who has access, through preferably a single modem 40, to a voice telephone 42 and a computer 50. The specialist's computer 50 is equipped with software suitable for displaying, in a usable manner, diagnostic data ultimately from the diagnostic means 12 in machine 10 (the computer 50 may also include means for the specialist to adjust conditions with the machine 10, as demonstrated in the patents incorporated by reference). In this way, the specialist will be able to view, essentially instantaneously, data relating to the physical condition of machine 10.

The user's modem 30 and the specialist's modem 40 are connected via a connection 60. In a currently preferred embodiment, this connection 60 is simply the commercial telephone system or equivalent thereof. It is also conceivable that the connection 60 could be some sort of Internet connection or other ATM-based system. However, whatever particular communication channel is used, it is most preferable that the communication channel 60 be able to satisfactorily convey both voice data (between telephones 32 and 42) and diagnostic data (between diagnostic means 12 and computer 50). One system for meeting this requirement is a "digital simultaneous voice and data" (DSVD) system, using, for each modem 30 and 40, the general function of which is known in the art. (One commercially available system which can be adapted for this purpose is the Radicom™ Audio-Span™ system.) In such an embodiment, both the voice signals from telephones, and digital data from the diagnostic means 12 or computer 50, are sent through a single modem 30 or 40, and multiplexed with each other so that both types of data, voice and diagnostic data in computer-acceptable digital form, can pass through a single connection 60 such as a commercial phone line.

Figure 2:
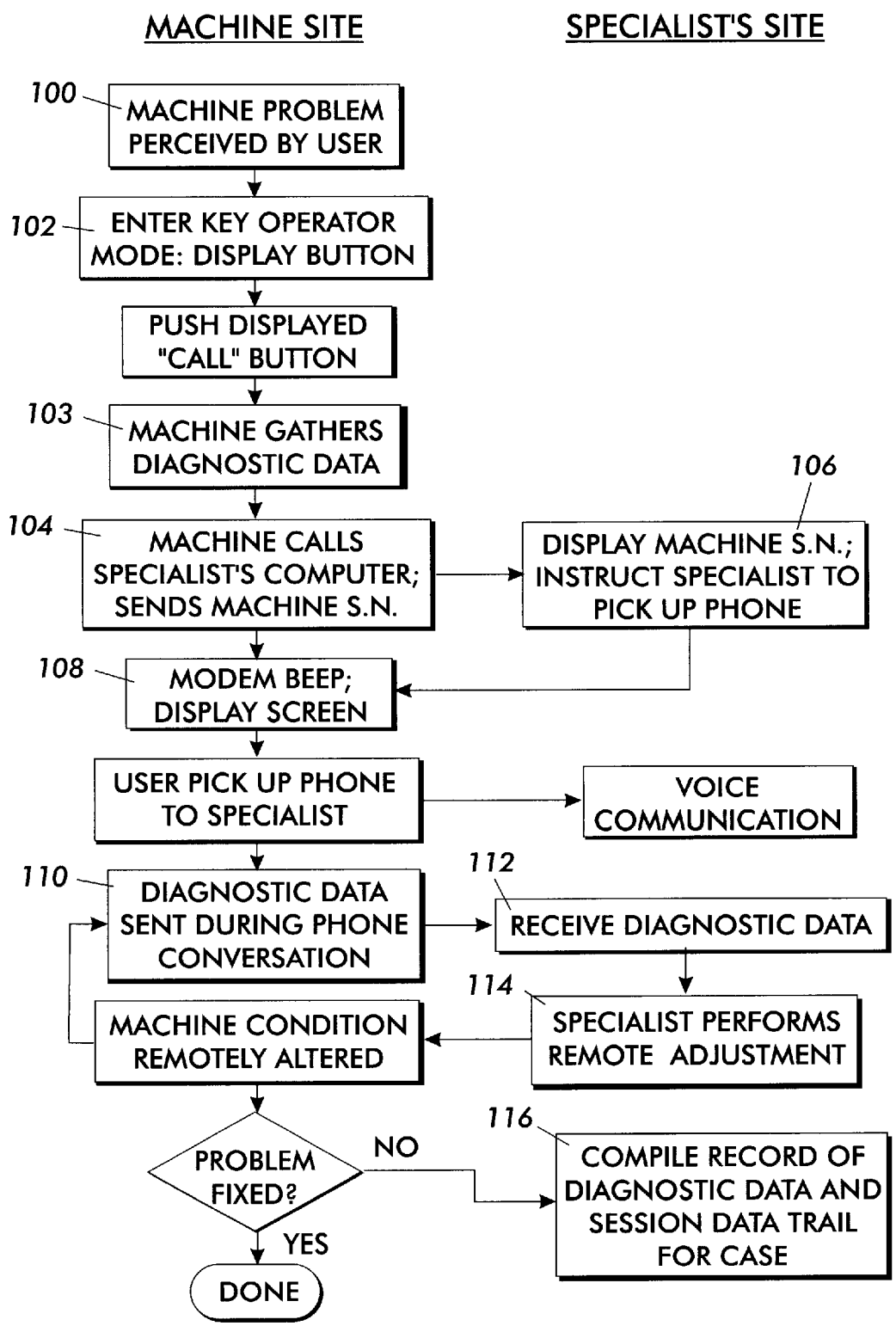
FIG. 2 is a flow chart showing the essential steps performed by a machine and a specialist's computer, according to the present invention.

Essential to the commercial success of the present invention is an interaction between exchanges of digital and voice data that appears seamless and convenient to the human user at machine 10. Thus, according to the present invention, there is provided a distinct sequence of events when establishing a contact between a user at machine 10 and a specialist giving the user verbal advice. This unique sequence of events is facilitated by a combination of software dwelling in the diagnostic means 12 and computer 50. The preferred embodiment of the sequence of events for initiating contact between user and specialist is shown in the flow chart of FIG. 2. In the flow chart, the left column indicates the general functions of the processors associated with machine 10, particularly including diagnostic means 12, while the right column indicates the general functions of computer 50 interacting with machine 10.

In a preferred embodiment of the invention, a transaction between a user of machine 10 and a remote specialist is initiated when the user perceives a problem with the machine 50, as shown at step 100. If the user perceives a problem, the user, or a key operator contacted by the user, enters a password to enter a "key operator mode," which causes special displays to appear on the UI 20, as shown at step 102. Preferably, one such key-operator-mode screen should include a button (such as on a touch screen, or activatable through a mouse-click) along with instructions that say, in effect, "to call service personnel, please push this button." If the user pushes the button, this button-push causes the modem 30 to initiate a call over connection 60 to the specialist. (It is also possible to have the transaction start when the diagnostic means 12 detects an unusual condition within machine 10, invisible to the user; in such a case the diagnostic means 12 can display to the user advice to contact the specialist.)

By virtue of the single button activation, the user does not have to know any particular phone number, and the call will go directly to a specialist who knows about the particular type of product that is machine 10; this way, no time is wasted with the user on the phone trying to find a particular specialist for his machine 10. This step of the machine calling the specialist's computer through modem 30 is shown at 104. According to a preferred embodiment of the present invention, this initial call to the specialist's computer through connection 60 and modem 40 includes a packet of data including the serial number for the particular machine 10, as well as an initial set of diagnostic data (relating to paper positions, voltages, temperatures, etc.) which has been gathered by the diagnostic means 12, such as at step 103 or earlier.

At step 106, when the modem 30 calls specialist's computer 50 the receipt of the machine's serial number can aid computer 50 to call up pre-stored information about the particular machine 10, including, for example, the name of the user, and the nature of the user's service contract. As the specialist sees this information on his computer screen, the specialist can then initiate a voice telephone call through his telephone 42; this voice telephone call can use the same connection 60 that has already been established between modems 30 and 40.

At step 108, the voice phone call from phone 42 causes the already-activated modem 30 to cause a screen to display to the user on UI 20, the screen basically informing the user to "please pick up the phone located near the machine." (It should be noted that the telephone connection was made when the modem 30 had called modem 40 at step 104, so there is no step of redialing.) It is typical, in designs of voice-data modems, to have the modem itself ring when receiving a voice call. The user will then pick up the phone. As the specialist now has information about the machine 10 on the screen at his computer 50, including typically the user's name, the specialist can immediately speak to the user 32, and address the user by name.

As shown at step 110, the current "snap shot" of diagnostic data from diagnostic means 12 is sent through connection 60 to populate labeled screens on the specialist's computer 50. Preferably, this transfer of diagnostic data occurs within the first few seconds of the phone conversation, and is initiated by the diagnostic means 12 in response to the beginning of the voice conversation. (According to alternate embodiments, the transfer of diagnostic data could be initiated in response to the specialist's computer causing user's phone 32 to ring, or even could accompany the original call from modem 30 to modem 40.) Thus, by the time greetings are exchanged between the user and the specialist, the human specialist has a complete set of the diagnostic data, and can use this data to advise the user (step 112).

As described in detail in some of the patents referenced above, it is known in "remote interactive control" systems common in the office equipment industry to enable a remote computer such as 50 not only to receive and display diagnostic data, but to remotely alter physical conditions (in the language of the claims, "performing a remote adjustment") within a machine 10. Typical examples of such remote interaction between computer 50 and a machine 10 include changing a voltage within an electromechanical part, or operating a servomotor such as to purge the machine of paper. According to the present invention, data transfers for such interaction by the specialist through computer 50 can occur during the phone conversation, as shown at step 114. Indeed, within a single phone conversation, it is expectable that there may occur several cycles of the specialist altering a condition within machine 10, and then receiving updated diagnostic data reflecting the altered condition within the machine 10.

It is preferable, of course, that whatever problem had been originally perceived by the user at the beginning of the transaction was solved by either the verbal advice of the specialist and/or the remote interaction of the specialist with machine 10. However, if the advice and interaction were not successful in overcoming the perceived problem, it will be necessary for the machine to be serviced by trained personnel visiting the machine 10. In a further preferred embodiment of the present invention, the software on computer 50 may include a "session data trail" feature, in which changes in the diagnostic data in the course of the phone conversation, such as caused by the specialist's suggestion to the user to manipulate the machine in a certain way, or record it and make it available for printout or other transfer (step 116). This session data trail can be useful in the hands of a hands-on technical representative or customer service engineer (CSE), in case such a person is necessary to service the machine at the customer site. The session data trail could conceivably include real-time audio of the phone conversation between the user and the specialist, such real-time audio being linked to a record of changes in the diagnostic data which occurred during the conversation. Also, the diagnostic data could be applied to an algorithm which automatically orders replacement parts for the machine 10 which are identified as likely for replacement by the nature of the diagnostic data.

The protocol of interactions between the diagnostic means 12 and the specialist's computer 50 provide the present invention with numerous practical advantages, resulting in a "seamless" presentation to the user. First, the use of a single-button calling utility, which is displayed only when a fault is detected, focuses the attention of the user to call service only when service is necessary; also, the fact that it is a single-button utility means that the user does not have to know a particular phone number. The fact that the specialist first sees the serial number, and other identifying information, of the machine 10, enables the specialist to identify the user of a machine. Also, under the present system, it is the specialist who initiates the actual voice conversation to the user, once again avoiding the problem that occurs when the user, for example, dials a 1-800 number and thus causes his phone to be busy at a critical time. Finally, the fact that the diagnostic data passes to the specialist's computer 50 only after voice communication between specialist and user has been established minimizes the chance of confusion caused by the specialist reading non-contemporaneous diagnostic data. In short, the protocol of the present invention, as manifest in the diagnostic means 12 and computer 50, provides the most useful communication between specialist and user and between computer and diagnostic means, with minimized chance of time-wasting accidents.

What is claimed is:

1. A machine adapted for a user and a remote specialist to perform a diagnostic procedure thereon, the specialist having a computer, comprising:

diagnostic means for gathering diagnostic data about a physical condition of the machine, the diagnostic means further including means for identifying the machine by a serial number;

communication means whereby diagnostic data can pass between the diagnostic means and the specialist's computer, and voice data can pass between the user and the specialist, the communication means including a single communication channel for diagnostic data and voice data, the single communication channel being a computer network connection;

means, disposed on the machine, for the user to initiate communication with the specialist; and the communication means sending the serial number of the machine to the specialist's computer and causing the specialist's computer to initiate voice communication to the user in response to the user initiating communication with the specialist.

2. The machine of claim 1, further comprising means for sending the diagnostic data to the specialist's computer in response to a beginning of voice communication between the user and the specialist.

3. The machine of claim 1, further comprising means for sending the diagnostic data to the specialist's computer in response to the specialist's computer initiating voice communication to the user.

4. The machine of claim 1, the means for the user to initiate communication with the specialist including a single button associated with the machine for the user to activate.

5. The machine of claim 1, further comprising means for the specialist to perform a remote adjustment within the machine.

6. The machine of claim 1, further comprising means for recording a session data trail.

7. The machine of claim 1, further comprising means for ordering replacement parts, the replacement parts being identified by the specialist.

8. A method of performing a diagnostic procedure on a machine attended by a user by a specialist having a computer, comprising:

gathering diagnostic data about a physical condition of the machine, the diagnostic data including a serial number;

passing diagnostic data between the machine and a specialist's computer, and passing voice data between the user and the specialist, via a single communication channel for diagnostic data and voice data, the single communication channel being a computer network connection;

the user initiating communication with the specialist; and sending the serial number of the machine to the specialist's computer and causing the specialist's computer to initiate voice communication to the user in response to the user initiating communication with the specialist.

9. The method of claim 8, further comprising sending the diagnostic data to the specialist's computer in response to a beginning of voice communication between the user and the specialist.

10. The method of claim 8, further comprising sending the diagnostic data to the specialist's computer in response to the specialist's computer initiating voice communication to the user.

11. The method of claim 8, further comprising displaying a single button associated with the machine for the user to activate to initiate communication with the specialist.

12. The method of claim 8, further comprising the specialist performing a remote adjustment within the machine.

13. The method of claim 8, further comprising recording a session data trail.

14. The method of claim 8, further comprising ordering replacement parts identified by the specialist.

* * * * *